(12) United States Patent
Adams

(10) Patent No.: X9316
(45) Date of Patent: Jan. 13, 1836

(54) HULLING COFFEE BERRY

(76) Inventor: Isaac Adams

United States Patent Patent No.: X9316

Isaac Adams. of Boston . Mass:
Letters Patent

The schedule referred to in these Letters Patent, and making part of the same containing
a description in the words of the said Isaac Adams, himself of his improvement in machinery
for breaking or cracking in pieces the husks of the coffee berry.

---

To all persons to whom these presents shall come, Isaac Adams of Boston in the County
of Suffolk and State of Massachusetts sends greeting . .
Be it known, that I the said Isaac Adams, have invented, made, and applied to
use, new & useful improvements of machinery for [illegible] & breaking in pieces the husks of
the coffee berry, which improvements I have fully set forth & described in the following
words and drawings annexed, which taken together, form my specification. –
Fig. 1 represents the machinery I have contemplated for the first mode of operation which
consists of a circular cast iron plate A, having suitable [illegible] or projecting teeth formed
on its upper surface, and which is supported on a suitable frame work of timber or cast
iron or other proper material shaped as seen in the drawing or otherwise properly constructed,
to answer the intended purpose of supporting the said plate and machinery connected
to it. over the plate A is a second plate B whose under surface is furnished or covered
with suitable teeth similar to the plate A. through the centre of the plate B an upright
shaft C [illegible] and is secured by wedges, or otherwise to the plate B. The lower extremity
of the shaft C. is supported and turns in a step or box attached to the horizontal
part E. of the frame. F is a bevelled wheel on the shaft C which is made to turn
round by a bevelled wheel G. on the end of a horizontal shaft H. on whose other extremity
is a handle, pulley or other convenience for giving motion to the said shaft H. .
The berries being put in the hopper I, pass downward between the plates A. B. and
motion being given to the plate B. as it revolves it cracks or breaks open the husks
of the coffee which are afterwards separated from or [illegible] by the process of winnowing.
The upper plate B. may be raised above, or set at any convenient distance from
the lower plate A. by means of a screw acting on the bottom of the box or step in
which the foot of the vertical shaft C. rests & turns.
The object of the above change in the distance of the plates from each other is to
accommodate the machinery to operate on the different kinds of coffee – the berries being quite different as to size in the different countries where produced — .. —
Instead of the grinding surfaces being circular planes, the lower A. may be crowned
in the centre, or may be bell shaped or slightly conical, or otherwise properly formed
for the purpose. and the upper B. may be made concave, to correspond to any convexity
of the lower plate, so as to facilitate the operation of breaking or cracking in pieces the
husks from around the seeds. In my second construction of the apparatus, the frame
work and the lower plate A. are in all respects similar to that first mentioned, but
instead of an upper plate of iron as heretofore described, I connect to the top of the ver-
tical shaft C (fig. 2) the ends of a series of arms which radiate outward and terminate
at their opposite extremities in a ring a. These arms may be of cast or wrought iron
or other suitable material. To each of the arms are attached the ends of springs
of steel bbb. &c. (as seen in the drawing) set at proper distances asunder.
The holes are bored in the ends of the said springs into which the ends of small conic
fluted rollers c.c.c.c. &c. are inserted. The rollers on one of the arms are set at suitable
distances from each other while those on the arm next contiguous are so placed as to be
opposite the places between the rollers on the arm first mentioned, and soon throughout
the series. By this arrangement every part of the surface of the lower plate A. is
brought in contact with the surfaces of the small rollers during the revolution of
the arms. On the opposite side of the arms on which are the springs bbb. &c. supporting
the fluted rollers c.c.c. &c. I attach by means of hinges d.d.d.d. &c. plates e.e.e.e. &c. of
cast iron or other proper material suitably formed or grooved on the under surface
or having projecting teeth thereon to be acted on and pressed downward by springs
f.f.f.f. &c. The object of springs supporting the small rollers & plates c.c.c. &c. is, that when
a berry of coffee is presented between the lower plate and one of the rollers, or plates
c.c.c. the force tending to crush or crack the outer husk may be relieved by the springs
so as not to break in pieces the seed or kernel of the coffee. The whole top and sides of
the machine may be inclosed in a proper casing of wood or other suitable material
and surmounted by a hopper. To the arms may be attached any convenient num-
ber of rollers, and the whole may be constructed of such suitable size, form, and ma-
terial as shall best answer the intended purpose —
What I claim is, The invention &c. of the lower plate or surface of cast iron or
other suitable metal with furrows or projecting teeth on it, shaped & formed in the different
ways heretofore described, to operate with an upper plate or surface or series of arms, fluted rollers and plates, or any other machinery - which may be attached to it .. ...
And I also claim a series of radial arms, having attached to them a series of springs, plates, and rollers, as above described - to be used in connection with a lower surface, as heretofore mentioned - for the purpose of breaking or cracking the outer husks of the coffee berry -

In testimony that the above is a true specification of my said invention & improvements, I have hereunto set my hand this eleventh day of December, in the year of our Lord eighteen hundred and thirty-four.

Witnesses

Robt. H. Eddy
Thomas [illegible]

Isaac Adams

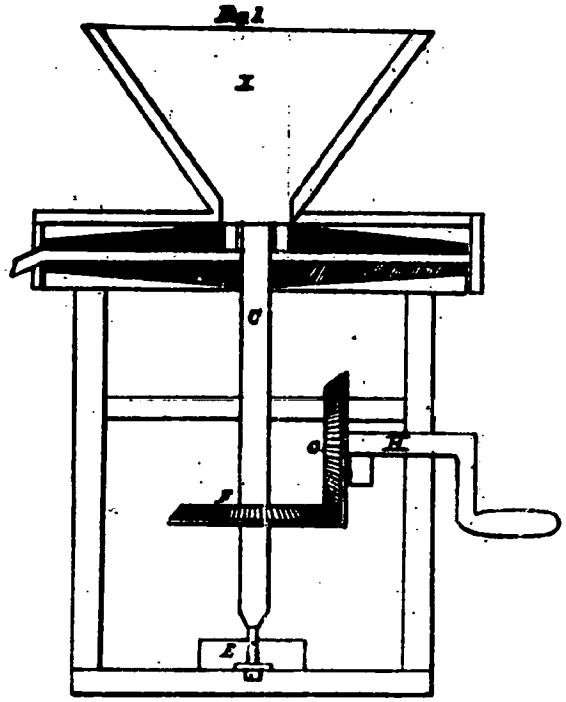
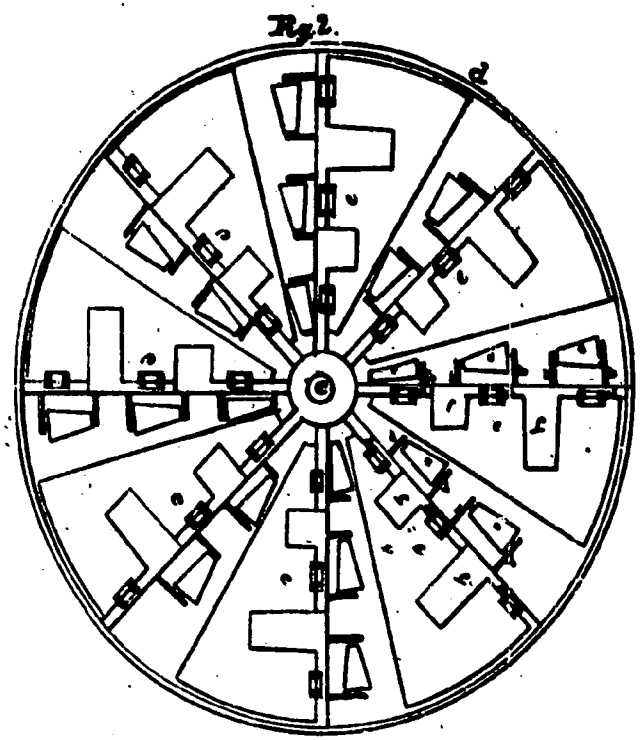

United States Patent
Patent No.: X9316
I. ADAMS.
MACHINE FOR BREAKING THE HUSKS OF COFFEE BERRIES.
Patented Jan. 13, 1835.